March 3, 1964   E. W. SCHELLENTRAGER   3,123,166
LOAD CELL MOUNTING AND ALIGNMENT FOR WEIGHING MEANS
Filed Feb. 23, 1962   2 Sheets-Sheet 1
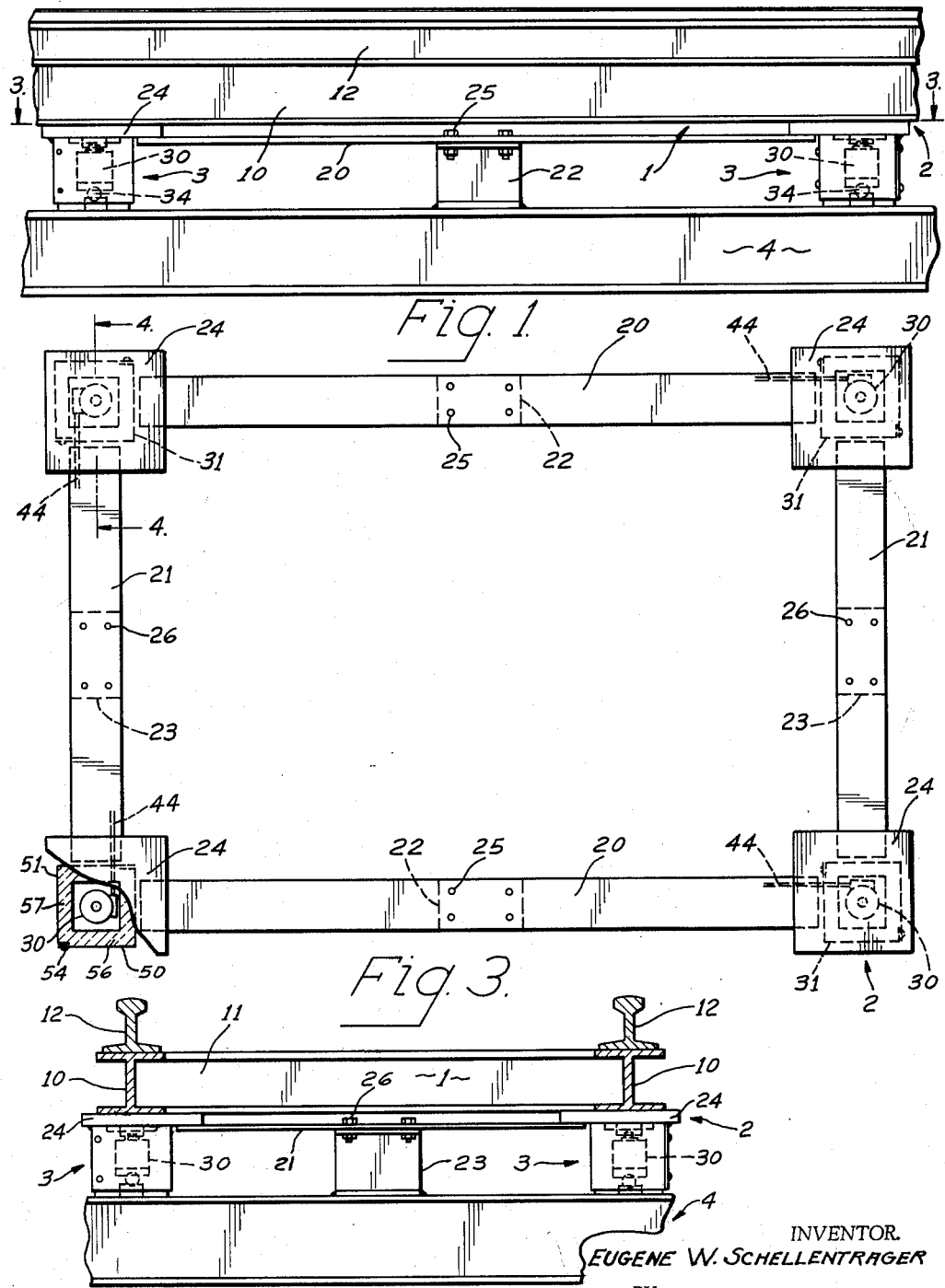
INVENTOR.
EUGENE W. SCHELLENTRAGER
BY
ATTORNEYS.

March 3, 1964   E. W. SCHELLENTRAGER   3,123,166
LOAD CELL MOUNTING AND ALIGNMENT FOR WEIGHING MEANS
Filed Feb. 23, 1962   2 Sheets-Sheet 2

INVENTOR.
EUGENE W. SCHELLENTRAGER
BY
Meyer, Baldwin, Doran & Egan
ATTORNEYS.

3,123,166
Patented Mar. 3, 1964

3,123,166
LOAD CELL MOUNTING AND ALIGNMENT FOR WEIGHING MEANS
Eugene W. Schellentrager, Shaker Heights, Ohio, assignor to The Atlas Bolt & Screw Company, Cleveland, Ohio, a corporation of Ohio
Filed Feb. 23, 1962, Ser. No. 175,017
15 Claims. (Cl. 177—211)

This invention relates to weighing apparatus and particularly to means for mounting and aligning load cells in a weighing device adapted for weighing heavy loads such as trucks, railroad cars, and the like.

Conventionally, weighing apparatus of the above type comprises a plurality of load cells mounted below a weighbridge or platform upon which the truck, railroad car, or other heavy vehicle is driven. An important problem which arises in connection with the mounting of the cells is that of preventing horizontally directed loads from being applied to the load cells. It will be evident that the stopping and starting of a heavily loaded vehicle upon the weighbridge inevitably transmits a horizontal thrust to the bridge, and the bridge must, therefore, be firmly anchored to prevent damage to the load cells.

The load cells herein referred to may be of any suitable kind such as those employing electrical resistance type strain gages. A number of this type of load cells are commercially available and are presently in common use. Correct operation of these load cells requires that they be substantially vertically aligned, and the application of horizontal loads thereto not only results in error in the results obtained by the weighing operation but also tends to damage the cells.

It is, therefore, an important object of this invention to provide means for mounting a plurality of load cells in a weighing apparatus of the type referred to wherein the cells are maintained in substantial vertical alignment in use of the apparatus.

Another object of the invention is to provide an improved weighbridge stabilizing means which prevents horizontal loads from being applied to the load cells.

Still another object of the invention is to provide improved means for initially aligning the load cells relative to the weighbridge.

Yet another object of the invention is to provide, in an apparatus of the above type, means for effecting an even distribution of weight upon the load cells even though the weighbridge itself is not precisely level.

Another object of the invention is to provide an improved mounting means for the base of each individual load cell in a weighing apparatus as set forth above.

Further objects of the invention and its numerous advantages will be evident from the following description of one embodiment thereof and the accompanying drawings, in which said drawings:

FIG. 1 is a side elevation of the weighing apparatus of this invention;

FIG. 2 is an end elevation of the apparatus of FIG. 1;

FIG. 3 is a top plan view of a stabilizing frame upon which the weighbridge is mounted as seen from the line 3—3 of FIG. 1;

Figure 4:
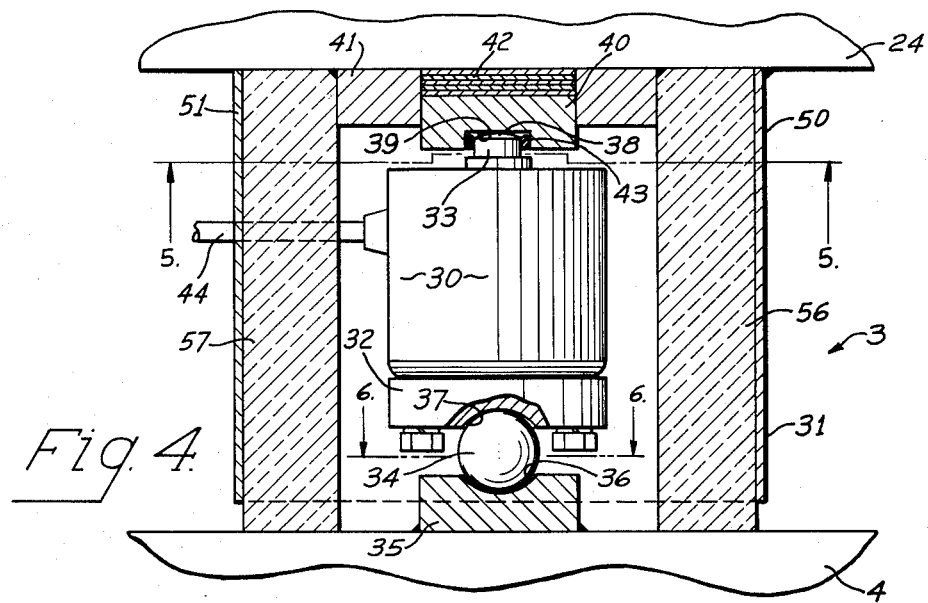
FIG. 4 is a section of one of the load cells taken generally along the line 4—4 of FIG. 3.

Referring now to the drawings and particularly to FIGS. 1 and 2, the weighing apparatus of this invention generally comprises a weighbridge 1 mounted upon a stabilizing frame 2, which said frame is rectangular in shape and supported at the four corners thereof by load cell assemblies 3. The stabilizing frame and its associated load cell assemblies are, in turn, mounted upon a fixed base 4 which may comprise any type of suitable, sturdy structure adapted to support a loaded, heavy vehicle such as a truck or railroad car.

The weighbridge 1 may be of any suitable construction, and as herein illustrated comprises a rigid frame structure having a pair of longitudinally disposed, laterally spaced, parallel I-beams 10 laterally connected to each other by one or more cross members 11. Said weighbridge may be provided on its upper surface with a solid platform or driveway when used for weighing highway type vehicles or, as herein illustrated, it may support a pair of rails 12. The rails 12 are secured in any suitable manner upon the upper surfaces of the I-beams 10 preferably parallel with said I-beams, and it will be understood that said rails are so laterally spaced as to adapt the weighbridge for receiving a rail type vehicle such as a conventional railroad car. The construction of the weighbridge 1 as hereinabove set forth is given by way of illustration only and may take any form suitable for the general purpose indicated.

The stabilizing frame 2, as seen from above in FIG. 3, comprises a pair of longitudinally disposed check bars 20 disposed parallel with and below the I-beams 10 and a pair of lateral check bars 21 disposed at right angles to said I-beams adjacent the ends of said longitudinal check bars. The longitudinal check bars 20 are each supported intermediate the ends thereof by a support member 22 and the lateral check bars 21 are similarly each supported intermediate the ends thereof by a support member 23. All of the check bars project beyond their respective support members symmetrically in either direction, but the ends of said check bars adjacent the corners of the stabilizing frame 2 are spaced from each other. Each corner of the stabilizing frame, comprising a distal end of a check bar 20 and a distal end of a check bar 21, is joined by a corner plate 24. The check bars are welded or otherwise suitably secured to the bottom surfaces of the corner plates 24 and are rigidly connected to the support members 22 and 23 by any suitable means such as bolts 25 and 26, respectively. The support members 22 and 23 are, in turn, welded or otherwise suitably secured to the fixed base 4, and the weighbridge 1 is securely mounted upon the corner plates 24.

Figure 5:
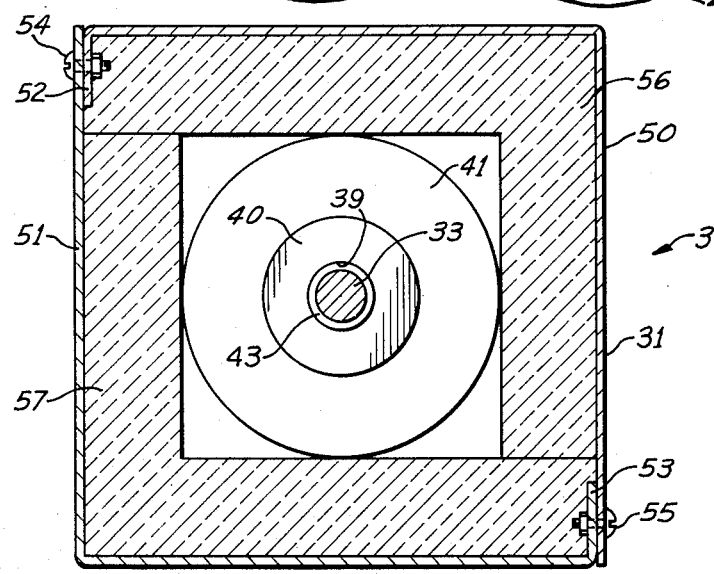
FIG. 5 is a section taken along the line 5—5 of FIG. 4.
Figure 6:
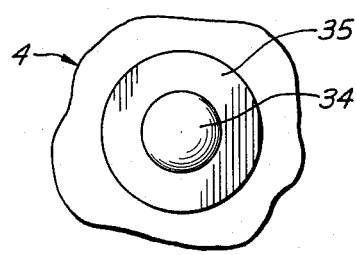
FIG. 6 is a view as seen generally from the line 6—6 of FIG. 4.

A load cell assembly is interposed between each corner plate 24 and the base 4. As best shown in FIGS. 4–6, each load cell assembly 3 comprises a load cell 30 encased in a load cell housing 31. The load cell 30 has a generally flat base 32 and an upwardly directed, diametrically reduced weighing column 33. The lower end of the load cell 30 is mounted upon the base 4 by means of a hardened steel ball 34. A hardened steel seat 35 is welded or otherwise suitably secured to the base 4 and affords at its upper surface a semi-spherical recess 36 into which the steel ball seats in a downward direction. The lower surface of the base 32 of the load cell is similarly provided with a semi-spherical recess 37 into which the steel ball 34 seats in an upward direction. The radii of curvature of the recesses 36 and 37 are slightly greater than the radius of the steel ball 34 whereby said steel ball makes substantially a low friction point contact within the respective recesses.

The upwardly directed column 33 has an upwardly convex, semi-spherical end portion 38 seated within a recess 39 of a hardened steel seat 40. The upper seat 40 is retained against horizontal movement by means of a preferably mild steel washer 41 which is welded or otherwise suitably secured to the lower surface of the adjacent corner plate 24. The seat 40 telescopically interfits the washer 41 and, as illustrated, a plurality of shims 42 are interposed between the corner plate and the upper flat surface of the seat 40. The shims 42 are provided where necessary at the different corners of the stabilizing frame 2 to equalize the distribution of weight upon the respective load cells whereby to compensate for any irregularity in the weighbridge 1 or the base 4. The recess or socket 39 of the seat 40 has a flat bottom surface and is substantially larger in diameter than the upper end of the column 33 seated therein. A resilient O-ring 43 is seated within the socket 39 and surrounds the end of the column 33 whereby said column is maintained substantially coaxial with said socket and the seat 40 during installation of the apparatus. A shielded cable 44 extends from the load cell 30 through a suitable opening in the wall of the housing 31, said cable housing the conductors to an electrical strain gage (not shown) within said load cell.

It is anticipated that the lower seat 35 may alternatively be retained by a washer, such as that shown at 41, welded to the base 4. In such case, the seat 35 itself would not be welded in place, and shimming of the load cell could be effected at the bottom thereof instead of at the top. With such arrangement the upper seat 40 would preferably be welded to the adjacent corner plate 24.

As well shown in FIG. 5, the housing 31 is preferably made of sheet material such as sheet metal and comprises a pair of complementary shells 50 and 51. The shells 50 and 51 are angle shaped in horizontal section, and are provided with right angular flanges 52 and 53 respectively at one vertical edge of each shell. The shells 50 and 51 are so complementarily assembled as to form a square in horizontal section with the flanges 52 and 53 disposed at opposite corners. Thus it will be seen that one wall of the shell 50 overlaps the flange 53 of the shell 51 whereas one wall of said shell 51 overlaps the flange 52 of said shell 50. The shell 50 is welded or otherwise suitably secured at its upper edge to the lower surface of the adjacent corner plate 24, and the shell 51 is fastened to the shell 50 by means of small bolts 54 and 55 which respectively connect the shell 51 to the flange 52 and the shell 50 to the flange 53. The detachable feature of the shell 51 facilitates the checking, repair, or replacement of the individual load cells after the entire weighing apparatus has been erected.

The shells 50 and 51 are lined with a suitable thermal insulation material such as fiberglass. Each shell is separately lined as illustrated by the insulator 56 of the shell 50 and the insulator 57 of the shell 51. The insulators are complementarily shaped to provide a complete thermal insulation around the associated load cell 30 when the shells 50 and 51 are assembled as illustrated in FIG. 5.

By referring to FIG. 4, it will be noted that the housings 31 do not extend downwardly all the way to the base 4 but have their bottom edges spaced upwardly therefrom. This construction insures that the housings will in no way interfere with or effect the proper action of the load cells 30. However, the insulators 56 and 57, which have no appreciable structural strength, extend downwardly below the lower edges of the shells 50 and 51 closely adjacent the base 4 whereby each load cell is completely surrounded by thermal insulation throughout its entire length.

Referring again to FIGS. 1 and 2 of the drawings, it will be noted that the corner plates 24 are substantially thicker in vertical dimension than either the longitudinal check bars 20 or the lateral check bars 21 and that said corner plates are welded to the upper surfaces of said check bars. The thickness of the corner plates 24 provides a substantial clearance between the upper surfaces of the check bars and the lower surface of the weighbridge 1 whereby the weighbridge can move downwardly a substantial distance in response to a load positioned thereon without contacting the check bars or the heads of the bolts 25 or 26. The actual vertical movement of the load cells during the weighing operation is very slight which means that only a moderate amount of clearance is necessary between the check bars and the weighbridge to prevent contact between the two elements.

The check bars 20 and 21 are preferably flat plates of steel and are of such thickness that their own weight over the distance of their span will cause a downward deflection at the ends of the bars which is in excess of the vertical movement of the load cells. The result is that when the load cells are mounted and properly adjusted, there is no possibility that the check bars 20 and 21 will afford any resistance to downward movement of the weighbridge thereby effecting a faulty reading during the weighing operation.

It will be readily seen that in actual use the check bars 20, firmly anchored intermediate their ends to the base 4 by the support members 22, prevent movement of the corner plates 24 in a longitudinal direction or in the direction of the rails 12. In like manner, the corner plates are held against lateral movement by the check bars 21 which are firmly anchored to the base by means of the support members 23. The welding of the entire stabilizing frame 22 is preferably accomplished after the weighbridge has been erected whereby the chance of misalignment of any of the enumerated parts is negligible. After the checking arrangement is complete, the bottom seats 35 and the washers 41 holding the upper seat 40 are welded in place with the load cells 30 in an axially vertical position.

The steel seats 35 and 40 may be made from hardened tool steel stock and are easily machined to provide the seating recesses 36 and 39. Leveling of the weighbridge and an even distribution of the weight upon the load cells 30 is accomplished simply by the use of the required number of shims 42 of the required thickness.

Although modern load cells are temperature compensated, it has been found that in actual use where the cells are subject to substantial temperature changes, it is preferred to use some kind of insulation such as the insulators 56 and 57 of the housing 31. The housing is preferably made from sheet steel material having substantial strength whereby the load cells are protected from mechanical damage thereto.

It has been found that the ball type mounting at the bottom of the load cell in combination with the semispherical upper end of the column 33 effectively prevents any horizontal load from being applied to the load cells such as might result from a slight change in the length of the check bars due to temperature variation or any slight movement of the corner plates 24 due to the inherent resilience of the material from which the apparatus is constructed.

It will be understood that many changes in the details of the invention as herein described and illustrated may be made without, however, departing from the spirit thereof or the scope of the appended claims.

What is claimed is:

1. A weighing apparatus comprising a weighbridge; a rectangular stabilizing frame disposed below said weighbridge; a plurality of load responsive instrumentalities disposed beneath the corners of said frame; said frame and said instrumentalities being separatedly mounted upon a common support means in use of the apparatus; the corners of said frame movable in a vertical direction only; said weighbridge bearing upon said corners only of said frame.

2. A weighing apparatus comprising four elongated check bars so disposed as to substantially form a rectangle; support means connected to each check bar intermediate the ends thereof and anchored to a fixed base surface in use of the apparatus; corner plates connecting adjacent pairs of said check bars and having upper support surfaces disposed above said check bars; load cells disposed beneath said corner plates; a weighbridge mounted upon said support surfaces of said corner plates; said check bars being flexible in such manner as to allow vertical movement only of said corner plates.

3. A weighing apparatus as set forth in claim 2 wherein the recited check bars are of such thickness and length that the ends thereof normally deflect downwardly a distance in excess of the vertical movement of said load cells in use of said cells.

4. A weighing apparatus as set forth in claim 2 wherein the recited load cells are each mounted upon a hardened ball; means defining a concave recess in the lower end of each load cell into which each said ball projects in an upward direction; and a hardened recessed seat disposed below each said cell into which said ball projects in a downward direction.

5. A weighing apparatus as set forth in claim 4 wherein the recited recesses are semi-spherical in shape and of greater radius than said ball.

6. A weighing apparatus as set forth in claim 5 wherein each recited load cell is encased in a thermal insulated housing.

7. A weighing apparatus comprising four flat, elongated, flexible check bars so disposed as to substantially form a rectangle; a support disposed centrally beneath each bar and secured to said bar and a base surface; corner plates connecting adjacent pairs of said check bars at the corners of the rectangle and secured to the upper surfaces of said bars; a first seating means disposed beneath the bottom surface of each corner plate; a second seating means disposed on a base surface below each said first seating means; a load cell having an upwardly directed column disposed in each said first seating means; each said load cell having a base which is upwardly semi-spherically recessed; a ball bearing member disposed between each said recess and second seating means; and a weighbridge supported only upon said corner plates.

8. A weighing apparatus as set forth in claim 7 wherein each recited second seating means is semi-spherically recessed and wherein all of the recited recesses are of greater radius than the recited ball bearing members.

9. A weighing apparatus as set forth in claim 8 wherein the recited first seating means afford flat surfaces against which said columns bear; the upper ends of said columns having semi-spherical end portions abutting said flat surfaces.

10. In a weighing apparatus of the type employing a plurality of load cell assemblies arranged to each support its distributive share of a load; each said assembly comprising first support means for receiving the load thrust; a load cell disposed beneath said first means; a bearing seat disposed below said load cell and mounted upon second support means; said load cell and said seat affording semi-spherical recesses therein; a hardened ball bearing member disposed between said load cell and bearing seat and seated within said recesses; said load cell having an upwardly directed, load responsive column; an upper bearing seat against which said column bears disposed beneath the lower side of said first support means; a retaining washer secured to said first support means and closely surrounding said upper bearing seat adjacent said first support means; and shim means optionally disposable within said washer to assure that said load cell receives its distributive share of the load.

11. A weighing apparatus as set forth in claim 10 wherein said recited load cell is encased in a thermal insulated housing.

12. In a weighing apparatus of the type employing a plurality of load cells arranged to each support its distributive share of a load; support means for receiving the load thrust; a load cell disposed beneath each said support means; a bearing seat disposed below each said load cell; each said load cell and each said seat affording semi-spherical recesses therein; a hardened ball bearing member disposed between each said load cell and bearing seat and disposed within said recesses; means retaining said support means against horizontal movement and affording to said support means vertical movement; each recited load cell being encased in a housing; each said housing comprising a pair of shells complementarily formed to cooperantly surround its associated cell; one of each pair of said shells secured to one of said support means; the other of each pair of said shells detachably connected to said one of the pair; and each shell being separately lined wtih thermal insulation material.

13. A weighing apparatus comprising a rectangular weighbridge; a rectangular, flexible, stabilizing frame disposed below said weighbridge; a pluraltiy of load responsive instrumentalities disposed beneath the corners of said frame; said frame and said instrumentalities being separately mounted upon a common support means in use of the apparatus; said frame anchored to said common support means intermediate said corners whereby the corners of said frame are movable in a vertical direction only; said weighbridge bearing upon said corners only of said frame.

14. A weighing apparatus as set forth in claim 13 wherein each recited load responsive instrumentality is encased in a thermal insulated housing.

15. A weighing apparatus as set forth in claim 13 wherein each recited instrumentality is encased in a housing; each said housing comprising a pair of shells complementarily formed to cooperatively surround its associated instrumentality; one of each pair of said shells secured to said frame; the other of each pair of said shells detachably connected to said one of the pair; and each shell being separately lined with thermal insulation material.

References Cited in the file of this patent

UNITED STATES PATENTS

| 2,352,934 | Bohannan | July 4, 1944 |
| 2,793,851 | Ruge | May 28, 1957 |
| 2,882,036 | Lyons | Apr. 14, 1959 |
| 2,901,235 | Bradley | Aug. 25, 1959 |
| 2,035,528 | Bolton | May 22, 1962 |

FOREIGN PATENTS

| 622,047 | Germany | Jan. 3, 1936 |
| 648,306 | Germany | July 28, 1937 |
| 953,465 | France | Dec. 7, 1949 |